US011098697B2

(12) United States Patent
Egholm et al.

(10) Patent No.: US 11,098,697 B2
(45) Date of Patent: Aug. 24, 2021

(54) EQUIPMENT FOR HANDLING A WIND TURBINE COMPONENT AND METHOD OF ASSEMBLING SUCH EQUIPMENT AND HANDLING A WIND TURBINE COMPONENT USING SUCH EQUIPMENT

(71) Applicant: Vestas Wind Systems A/S, Aarhus N. (DK)

(72) Inventors: Johnni Egholm, Skjern (DK); Michael Pilgaard Hansen, Sønder Felding (DK); Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 245 days.

(21) Appl. No.: 16/337,489

(22) PCT Filed: Sep. 29, 2017

(86) PCT No.: PCT/DK2017/050319
§ 371 (c)(1),
(2) Date: Mar. 28, 2019

(87) PCT Pub. No.: WO2018/059644
PCT Pub. Date: Apr. 5, 2018

(65) Prior Publication Data
US 2020/0032773 A1    Jan. 30, 2020

(30) Foreign Application Priority Data
Sep. 30, 2016 (DK) .......................... PA 2016 70775

(51) Int. Cl.
*F03D 13/10* (2016.01)
*B66C 1/10* (2006.01)
*B66C 1/66* (2006.01)

(52) U.S. Cl.
CPC .............. *F03D 13/10* (2016.05); *B66C 1/108* (2013.01); *B66C 1/66* (2013.01); *F05B 2230/61* (2013.01); *F05B 2240/912* (2013.01)

(58) Field of Classification Search
CPC . F03D 13/10; B66C 1/108; B66C 1/66; F05B 2230/61; F05B 2240/912; Y02E 10/72; Y02E 10/728; Y02P 70/50
See application file for complete search history.

(56) References Cited

U.S. PATENT DOCUMENTS 5,800,000 A * 9/1998 Shockley ................ B66C 1/107
 294/67.5
8,960,747 B2 * 2/2015 Steffensen .............. B66C 1/108
 294/67.5
9,316,208 B2 * 4/2016 Friis ........................ B66C 1/108

FOREIGN PATENT DOCUMENTS

CN     101479179 A    7/2009
CN     202316804 U    7/2012
(Continued)

OTHER PUBLICATIONS

European Patent Office, International Search Report and Written Opinion in PCT Application No. PCT/DK2017/050319, dated Dec. 8, 2017.

(Continued)

*Primary Examiner* — Stephen A Vu
(74) *Attorney, Agent, or Firm* — Wood Herron & Evans LLP

(57) ABSTRACT

Equipment for handling a wind turbine component includes a lifting cable and a mounting block having a block main body with a cable passage and a pair of bushings coupled to the mounting block. Each bushing has an aperture defined by an aperture wall and the lifting cable extends through the aperture of each of the bushings. At least an outer region of the aperture wall forms a closed loop about the lifting cable (Continued)

and is substantially circumferentially continuous. This allows the lifting cable extending the bushings to move in a circumferential direction along the aperture wall relative to the bushings during use. A method of assembling such handling equipment and a method of using such equipment for handling a wind turbine component is also disclosed.

16 Claims, 12 Drawing Sheets

(56) References Cited

FOREIGN PATENT DOCUMENTS

| | | | |
|---|---|---|---|
| CN | 203513100 U | 4/2014 | |
| CN | 204017922 U | 12/2014 | |
| CN | 204508554 U | 7/2015 | |
| CN | 204643546 U | 9/2015 | |
| DE | 102016008261 A1 * | 1/2018 | ............ B66C 1/42 |
| EP | 2527284 A1 | 11/2012 | |
| WO | 014123 A1 | 6/2001 | |
| WO | 2008000262 A1 | 1/2008 | |
| WO | 2011009500 A1 | 1/2011 | |

OTHER PUBLICATIONS

Danish Patent and Trademark Office, Search and Examination Report in PA 2016 70775, dated Apr. 11, 2017.
China National Intellectual Property Administration, First Notification of Office Action in CN Application No. 201780065512.8, dated Jan. 8, 2020.

* cited by examiner

US 11,098,697 B2

EQUIPMENT FOR HANDLING A WIND TURBINE COMPONENT AND METHOD OF ASSEMBLING SUCH EQUIPMENT AND HANDLING A WIND TURBINE COMPONENT USING SUCH EQUIPMENT

TECHNICAL FIELD

The present invention relates generally to wind turbines. More particularly the invention relates to equipment for handling a wind turbine component, such as a wind turbine tower section, during assembly of a wind turbine. The invention also relates to a method of assembling the equipment and handling a wind turbine component using the equipment during assembly of the wind turbine.

BACKGROUND

Wind turbines are used to produce electrical energy using a renewable resource and without combusting a fossil fuel. Generally, a wind turbine converts kinetic wind energy into mechanical energy and then subsequently converts the mechanical energy into electrical energy. As illustrated in FIG. 1, an exemplary wind turbine 10 includes a tower 12, a nacelle 14 located at the apex of the tower 12, and a rotor 16 having a central hub 18 and one or more blades 20 (e.g., three blades) mounted to the hub 18 and extending radially therefrom. The rotor 16 is supported by the nacelle 14 and positioned at the front of the nacelle 14 so that the rotor 16 faces into the wind upstream of its supporting tower 12. The rotor 16 may be coupled either directly or indirectly with a generator (not shown) housed inside the nacelle 14 and configured to convert the mechanical energy of the rotor 16 to electrical energy.

The wind turbine tower 12 is an elongated structure anchored to a foundation 22 or an off-shore platform (not shown) at a lower end thereof and extending vertically upward for well over one hundred meters for large scale wind turbines. Accordingly, and as illustrated in FIGS. 1-3, the wind turbine tower 12 is typically constructed from a plurality of tower sections 24 that are coupled together in an end-to-end fashion to assemble the tower 12. In this regard, the ends of the tower sections 24 typically include an inwardly directed tower flange 26 having a plurality of bores or through holes 28. A lifting device 30, such as a crane or the like, hoists a tower section 24 vertically in the air and positions the tower section above a lower tower section, such as the tower section coupled to the foundation 22. The flanges 26 of the two adjacent tower sections 24 are brought together in interfacing contact and fasteners, such as nuts/ bolts (not shown), are inserted through aligned through holes 28 of the adjacent flanges 26 and fastened so as to secure the adjacent tower sections 24 together. This process is then repeated until the tower 12 is assembled and extends to its operational height.

The coupling between the lifting device 30, including a hook 32 for example, and the tower section 24 being hoisted generally includes a pair of slings 34, each sling having a lifting cable 36 and a mounting block 38 operating as an interface between the lifting cable 36 and the tower section 24. In this regard, and as illustrated in FIG. 3, the mounting blocks 38 are configured to be mounted to the flange 26 of the tower section 24 being hoisted by the lifting device 30. A conventional mounting block 38 is shown in more detail in FIGS. 4 and 5, and further described in WO 2008/000262 the disclosure of which is incorporated by reference herein. As described below in more detail, each mounting block 38 is designed to operate with a closed-loop cable arrangement of the sling 34, such as for example, a closed-looped lifting cable 36. Accordingly, the mounting block 38 must be capable of being coupled with the lifting cable 36 without breaking the cable loop or creating a splice in the lifting cable 36. The capacity to couple a closed-loop cable to the mounting block may be a primary driver in the design of the mounting block 38.

As best illustrated in FIGS. 4 and 5, the mounting block 38 includes a block main body 40 generally having an upper surface 42, a lower surface 44, a pair of opposed side surfaces 46, 48, and a pair of end surfaces 50, 52. A pair of bolt passages 54, 56 extends between the upper and lower surfaces 42, 44 and is configured to receive respective bolts 58 for securing the mounting block 38 to the flange 26 of the tower section 24. The block main body 40 further includes a cable passage 60 extending between the side surfaces 46, 48 and configured to receive a portion of the continuous lifting cable 36 therein. A pair of bushings 62 (only one shown in FIG. 5) is positioned within openings 64 in the side surfaces 46, 48 and are configured to receive a portion of the cable 36 therein.

In this regard, and as illustrated in FIG. 5, the block main body 40 includes an opening or gap 66 in the side surfaces 46, 48 adjacent the lower surface 44 thereof. Moreover, the bushings 62 include a slot 68 that extend from a central region of the bushings 62 to an outer edge 70 thereof. When the slots 68 in the bushings 62 are in registration with the gaps 66 in the side surfaces 46, 48, continuous lifting cable 36 may be positioned within the cable passage 60 of the mounting block 38 by insertion from below. Once the lifting cable 36 is positioned in the cable passage 60, a locking plate 72 may be coupled to the block main body 40. The locking plate 72 closes off the lower surface 44 of the mounting block 38 to trap the lifting cable 36 within the cable passage 60 and prevent the lifting cable 36 from passing back out of the mounting block 38. In addition, the locking plate 72 secures the bushings 62 to the block main body 40, i.e., the bushings 62 cannot be pulled away or otherwise separated from the openings 64 in the side surfaces 46, 48 of the block main body 40.

During tower assembly, tower sections 24 are typically delivered to a wind turbine site in a horizontal orientation, but are then hoisted by the lifting device 30 to be in a vertical orientation for assembly. Thus, as one can image, the position of the lifting cable 36 relative to the mounting blocks 38 varies as the tower section 24 changes orientation from horizontal to vertical. Since it is generally considered undesirable for the lifting cable 36 to travel back along the slots 68 in the bushings 62 and engage the locking plate 72, which potentially could operate as a weak point in the integrity of the mounting block 38, or diminish the weight distribution benefits afforded by the bushings 62, the position of the lifting cable 36 relative to the bushings 62 is configured to be fixed.

The fixation of the relative positioning between the lifting cable 36 and the bushings 62 is achieved, at least in part, by a disk-shaped cap 74 fixed to the outer side of the bushings 62 by one or more fasteners 76. The cap 74 includes a cutout 78 that allows the lifting cable 36 to pass from the interior of the mounting block 38 to the exterior. The cutout 78 essentially captures the lifting cable 36 such that lifting cable 36 is not permitted to, for example, rotate about the circumference of the bushings 62 in either a clockwise or counterclockwise direction. In this way, the lifting cable 36 is not permitted to move back through the slot 68 in the bushings 62.

As noted above, however, the position of the lifting cable 36 relative to the mounting blocks 38 varies as the tower section changes orientation from horizontal to vertical during the hoisting of the tower section 24. Since the lifting cable 36 is now fixed relative to the bushings 62, to allow this variation as the tower section 24 is being hoisted, the bushings 62 are configured to rotate relative to the block main body 40 about a central axis of the cable passage 60. Allowing the bushings 62 to rotate relative to the block main body 40 prevents pinching or sharp bending of the lifting cable 36 at the exit point of the cable through the cutout 78 in the cap 74, thus minimizing the potential for large stress concentrations in the lifting cable 36 at this point during a lift operation.

However, in some instances, as a sling 34 (and associated mounting block 38) is repeatedly used for assembling tower sections 24, the bushings 62 may become seized or may no longer rotate relative to the block main body 40 during use as a result of wear, debris ingress, or other factors. When this occurs, large stress concentrations may be formed in the lifting cable 36 at the exit point of the cable 36 from the caps 74 as the tower section 24 changes orientation from horizontal to vertical during hoisting of the tower section. In other words, when the bushings 62 are prevented from rotating, the change in the orientation of the tower section is accommodated by forming a relatively sharp bend in the lifting cable adjacent the cap 74. The large stress concentrations associated with such a sharp bend may, in turn, weaken the sling 34 and increase the likelihood of cable failure during a lift operation.

Thus, while current sling and mounting block designs are generally successful for their intended purpose, wind turbine manufacturers continue to strive to improve upon current assembly devices and methodologies. More particularly, wind turbine manufacturers continue to strive to provide a sling or mounting block design that reduces the likelihood of experiencing large stress concentrations in the lifting cable during use.

SUMMARY

Equipment for handling a wind turbine component comprises a lifting cable and a mounting block for coupling the lifting cable to the wind turbine component. The mounting block comprises a block main body having a cable passage defined through the mounting block and a pair of bushings coupled to the mounting block in the cable passage. Each bushing has an aperture defined by an aperture wall and the lifting cable extends through the aperture of each of the bushings. At least an outer region of the aperture wall forms a closed loop about the lifting cable and is substantially circumferentially continuous.

In one embodiment, at least the outer region of the aperture wall is circumferentially symmetric. Moreover, in various other embodiments, substantially the entire length of the aperture wall forms a closed loop about the lifting cable, substantially the entire length of the aperture wall is circumferentially continuous, and substantially the entire length of the aperture wall is circumferentially symmetric. Furthermore, the aperture wall may smoothly and continuously increases in cross dimension along the outer region of the aperture wall. Substantially the entire length of the aperture wall may be smooth. In an exemplary embodiment, the aperture wall through each of the bushings may be trumpet-shaped.

In one aspect in accordance with the invention, due to the features of the aperture wall of the bushings, the lifting cable extending through each of the bushings is permitted to move in a circumferential direction along the aperture wall relative to the bushings. Accordingly, changes in orientation of the wind turbine component being lifted may be accommodated through the movement of the lifting cable relative to the bushings. It is not necessary for the bushings to be able to rotate relative to the block main body in order to accommodate the changes in orientation of the wind turbine component being lifted. In one embodiment, however, the bushings may be permitted to rotate relative to the block main body. Thus, orientation changes in the wind turbine component may first be accommodated by rotation of the bushings relative to the block main body. However, should rotation of the bushings relative to the block main body fail for some reason, the mounting block remains fully operational due to the ability of the lifting cable to move in the circumferential direction along the aperture wall relative to the bushings. This dual functionality certainly provides benefits in wind turbine field assembly operations. It should be realized, however, that rotation of the bushings relative to the block main body is not necessary and may be omitted by design. In such an embodiment, the mounting block has no relative moving parts during use of the equipment in a lift operation. The elimination of moving parts again may have certain advantages in field assembly operations.

Due to the design according to the invention, the equipment for handling the wind turbine component may include an intermediate sling assembly including a lifting cable having a first and second end and a pair of bushings positioned on the lifting cable intermediate the first and second ends, and a block main body. The block main body is configured to be positioned on the lifting cable between the first and second bushings such that the bushings may be coupled to the block main body in the cable passage. The first and second ends of the lifting cable may be coupled together to form a closed loop of the lifting cable. Alternatively, the first and second ends of the lifting cable may each include a lifting loop.

In another embodiment, a method of assembling equipment for handling a wind turbine component is disclosed. The method comprises providing a lifting cable having a first end and a second end and providing a mounting block for coupling the lifting cable to the wind turbine component. The mounting block comprises a block main body and a pair of bushings configured to be coupled to the block main body. Each bushing has an aperture defined by an aperture wall for receiving at least a portion of the lifting cable, wherein at least an outer region of the aperture wall forms a closed loop and is substantially circumferentially continuous. The method further comprises inserting at least one of the first and second ends of the lifting cable through the aperture in each of the bushings such that the bushings are threaded onto the lifting cable; inserting an intermediate portion of the lifting cable into a passage of the block main body; and coupling the bushings to the block main body to capture the lifting cable within the mounting block. The lifting cable extending through each of the bushings is permitted to move in a circumferential direction along the aperture wall relative to the bushings. The method may further include, subsequent to positioning the bushings onto the lifting cable, coupling together the first and second ends of the lifting cable to form a closed loop, or providing lifting loops at each of the first and second ends of the lifting cable.

A method of handling a wind turbine component using equipment assembled as described above comprises coupling the mounting block to a wind turbine component; coupling the lifting cable to a lifting device; and lifting the wind turbine component using the lifting device. During the lifting step, the lifting cable extending through each of the bushings moves in a circumferential direction along the aperture wall relative to each of the bushings. This allows the change in orientation of the wind turbine component being lifted by the lifting device to be accommodated by the mounting block without the bushings necessarily rotating relative to the mounting block.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
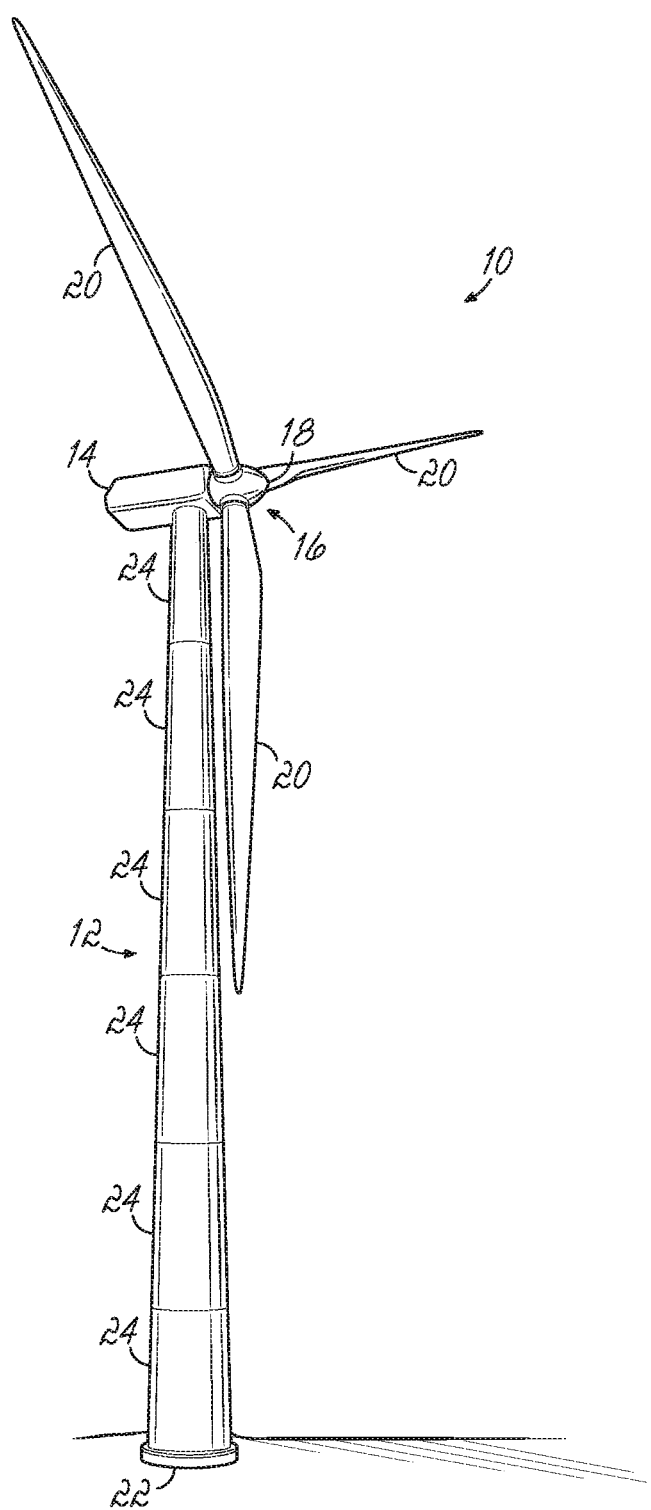
FIG. 1 is a perspective view of a wind turbine.

Referring to the figures, and to FIGS. 6-10B in particular, an exemplary sling 90 in accordance with an aspect of the invention for addressing the shortcomings discussed above is shown. Similar to the above, the sling 90 includes a lifting cable 92 and a mounting block 94 operating as an interface between the lifting cable 92 and the tower section 24. The mounting blocks 94 are configured to be coupled to the flange 26 of the tower section 24 being hoisted by the lifting device 30, similar to that described above. However, the mounting blocks 94 in accordance with the invention are designed so as to minimize the potential for large stress concentrations developing in the lifting cable 92 during use. More particularly, the mounting blocks 94 are designed to permit relative movement between the lifting cable 92 and the bushings of the mounting block 94, as explained in more detail below. This is significantly different than prior designs, which fix the relative positions of the lifting cable and the bushings of the mounting blocks. As a result of this change, the design of the sling 90 and the approach for assembling the sling 90 may be significantly altered.

Figure 7:
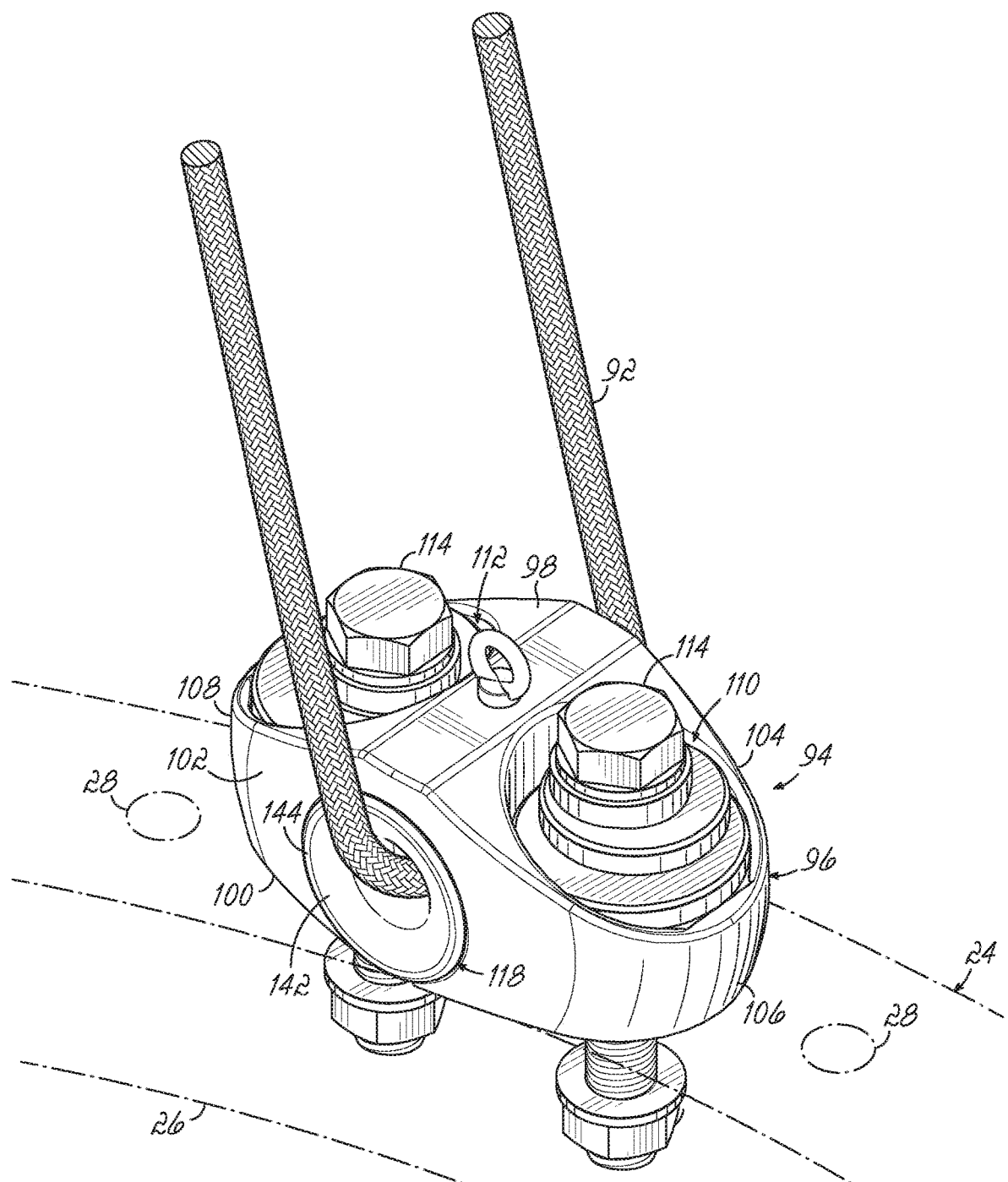
FIG. 7 is a perspective view of a mounting block for coupling a lifting cable to the wind turbine component in accordance with an embodiment of the invention.
Figure 8:
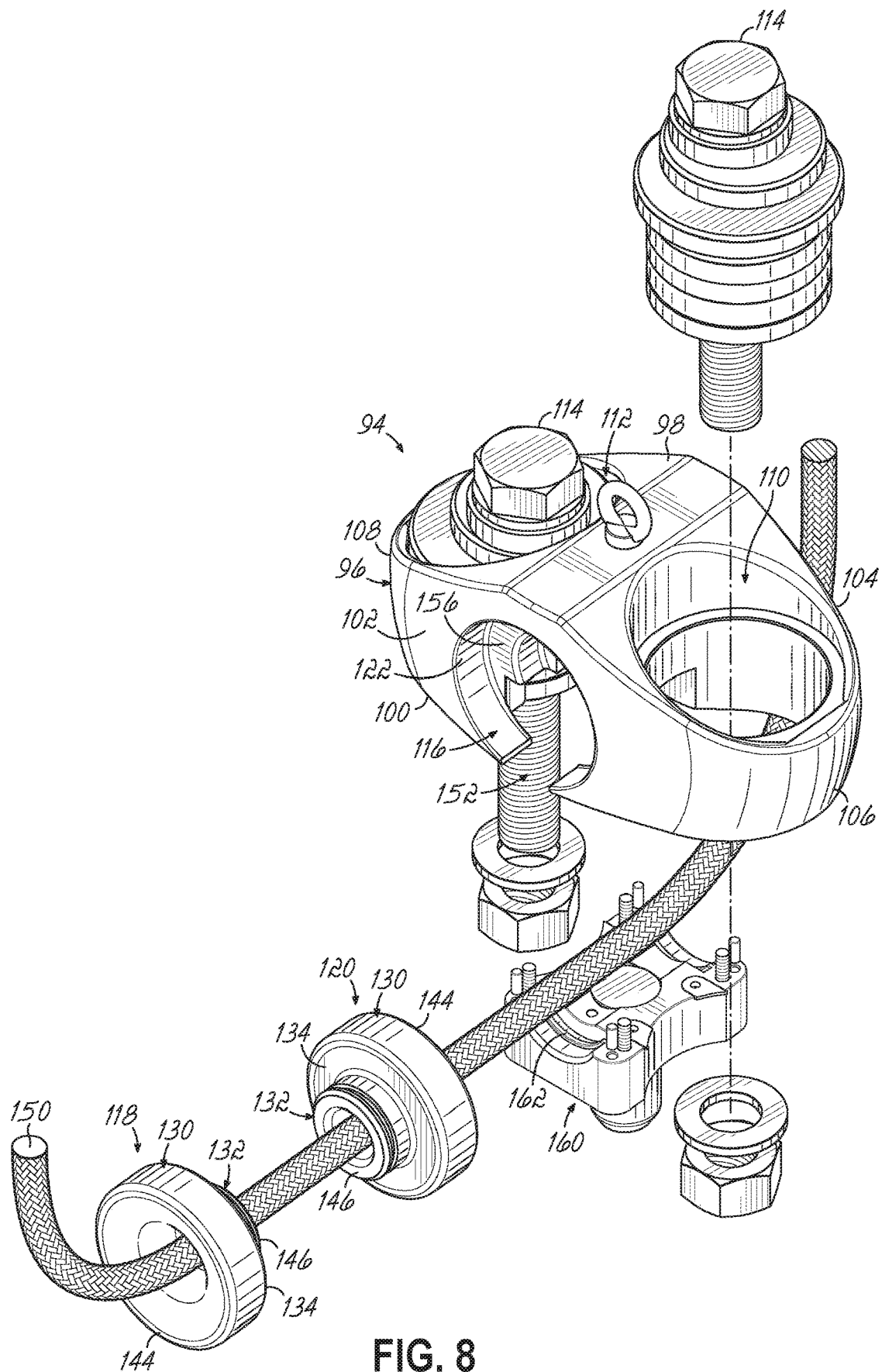
FIG. 8 is a disassembled perspective view of the mounting block shown in FIG. 7.
Figure 9:
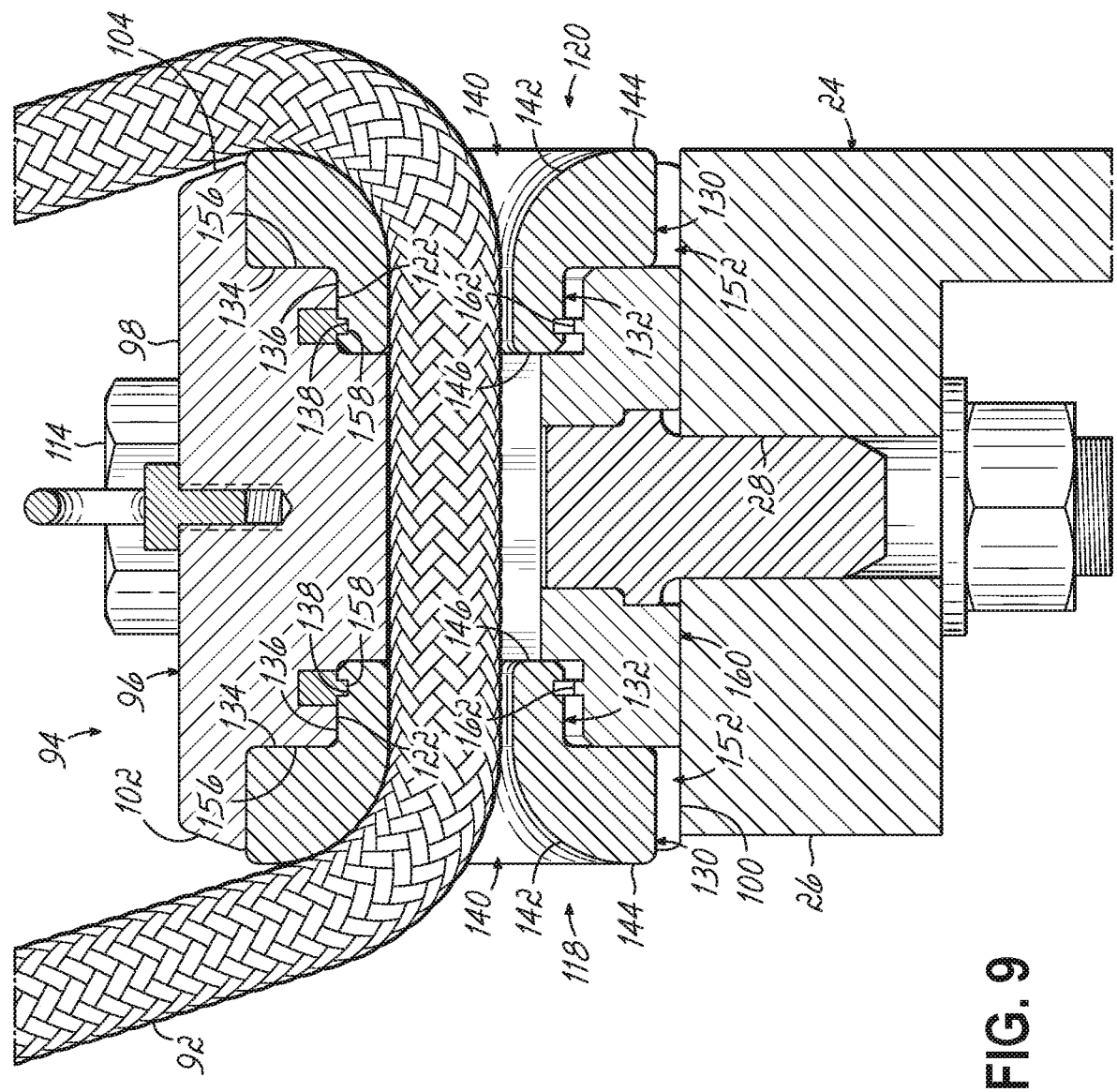
FIG. 9 is a cross-sectional view of the mounting block shown in FIG. 7.

An exemplary mounting block 94 is shown in FIGS. 7-9. The mounting block 94 includes a block main body 96 generally having an upper surface 98, a lower surface 100, a pair of opposed side surfaces 102, 104, and a pair of end surfaces 106, 108. A pair of bolt passages 110, 112 extends between the upper and lower surfaces 98, 100 and is configured to receive respective bolts 114 for securing the mounting block 94 to the flange 26 of the tower section 24. The block main body 40 further includes a cable passage 116 extending between the side surfaces 102, 104 and configured to receive a portion of the lifting cable 92 therein. A pair of bushings 118, 120 is positioned within openings 122 in the side surfaces 102, 104 and is configured to receive a portion of the lifting cable 36 therein. In accordance with an aspect of the invention, the mounting block 94 deviates from prior mounting blocks primarily in the design of the bushings 118, 120, which will now be explained in detail for bushing 118. It should be recognized that such a description will also generally apply to bushing 120.

Figure 10B:
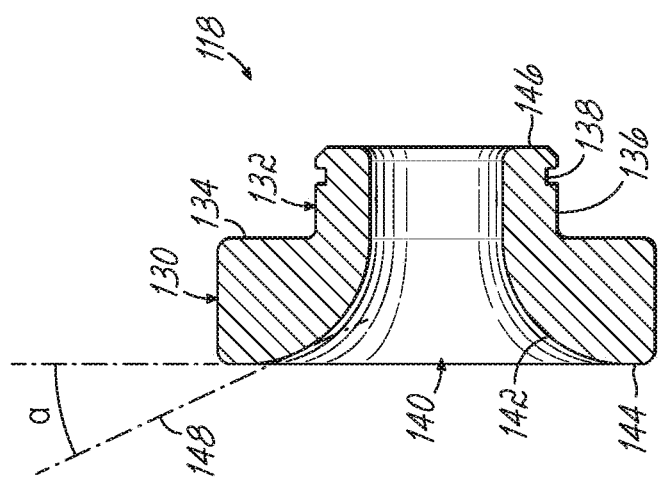
FIG. 10B is a cross-sectional view of the bushing shown in FIG. 10A.
Figure 10A:
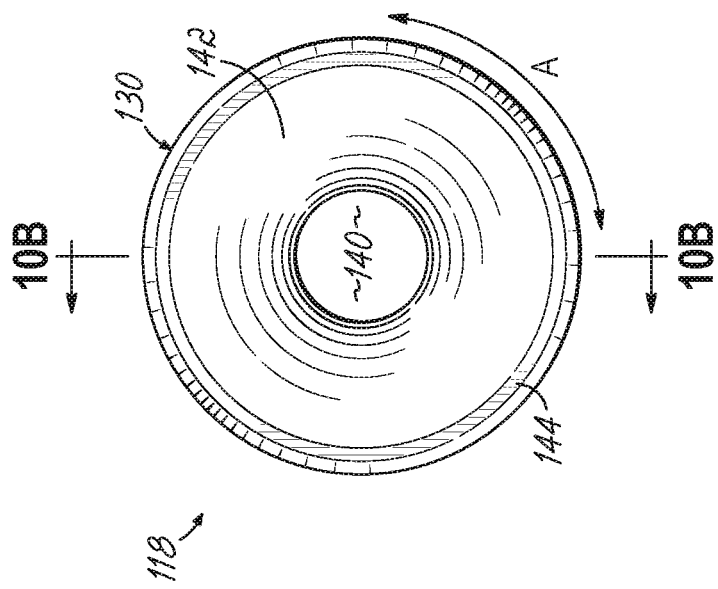
FIG. 10A is a front plan view of a bushing in accordance with an embodiment of the present invention.

Bushing 118 is generally disc shaped and having, for example, a T-shaped cross section (see FIGS. 9 and 10B). In this regard, the bushing 118 includes a generally cylindrical head 130 and a generally cylindrical nose 132 extending from the head 130 and having a cross dimension (e.g., diameter) less than a cross dimension of the head 130 to define a shoulder 134. The outer surface 136 of the nose 132 includes a groove 138, the purpose of which is explained below. The bushing 118 includes a central aperture 140 through both the head 130 and the nose 132 configured to receive the lifting cable 92 therethrough. As best illustrated in FIGS. 9-10B, the aperture 140 through the bushing 118 is generally defined by an aperture wall 142 that confronts the lifting cable 92 during use.

In accordance with an aspect of the invention, the aperture wall 142 may be configured to minimize large stress concentrations on the lifting cable 92 during use. This may be accomplished in a first instance, for example, by avoiding relative sharp corners or other discontinuities along the longitudinal length of the aperture wall 142, especially near the outer end or face 144 of the bushing 144. In this regard, in accordance with an aspect of the invention, the aperture wall 142 may be trumpet-shaped or funnel-shaped in an exemplary embodiment. More particularly, the aperture 140 may increase in cross dimension (e.g., diameter) in a smooth and continuous manner from an inner region of the aperture 140 toward the outer face 144. In one embodiment, for example, the cross dimension of the aperture 140 may smoothly and continuously increase from an inner face 146 to the outer face 144. In another embodiment, the cross dimension of the aperture 140 may be generally constant along an inner region of the aperture 140 (e.g., such as along the nose 132 of the bushing 118) and then along an outer region of the aperture, the cross dimension of the aperture 140 may smoothly and continuously increase toward the outer face 144. The cross dimension of the aperture 140 adjacent the inner face 146 may be just slightly greater than the cross dimension of the lifting cable 92 extending through the bushing 118. The cross dimension of the aperture 140 adjacent the outer face 144 may be about 1.5 or 2.0 or more times greater than that at the inner face 146. Other values may also be possible.

In one embodiment, a tangent line 148 of the aperture wall 142 taken adjacent the outer face 144 may form an acute angle relative to a plane defined by the outer face 144 of the bushing 118 (FIG. 10B). By way of example, the tangent line 148 may form an angle α less than about 45 degrees, and preferably less than about 30 degrees. Configuring the aperture 140 (alternatively the aperture wall 142 that defines the aperture 140) in this manner provides for a more uniform force distribution between the lifting cable 92 and the bushing 118 of the mounting block 94 and avoids any large stress concentrations due to the presence of sharp corners or other discontinuities in the length direction of the aperture 140.

In addition to the above, the aperture wall 142 may be configured to facilitate relative movement between the lifting cable 92 and the bushing 118. More particularly, the aperture wall 142 may be configured to facilitate relative movement between the lifting cable 92 and the bushing 118 in a circumferential direction of the aperture 140, as illustrated by arrow A in FIG. 10A. In this regard, the aperture wall 142 may be substantially circumferentially continuous along at least an outer region of the aperture wall 142 adjacent the outer face 144. In one embodiment, for example, the aperture wall 142 may be substantially circumferentially continuous along an outer 40%-70% of the length of the aperture wall 142. In an alternative embodiment, the aperture wall 142 may be circumferentially continuous along substantially the entire length of the aperture wall 142 from the inner face 146 to the outer face 144. In yet another exemplary embodiment, the aperture wall 142 may be circumferentially symmetric. In such an embodiment, the cross-sectional profile of the aperture wall 142 is substantially the same along the entire circumference of the aperture 140. In these various embodiments, the aperture wall 142 is sufficiently smooth such that the lifting cable 92 is able to slide along the aperture wall 142 of the bushing 118 in a generally circumferential direction without significant interference or resistance from features of the aperture wall 142 or bushing 118 itself.

Thus, the aperture wall 142 is substantially devoid of openings, slots, grooves, ridges and other discontinuities and/or deformations that might prevent or restrict the lifting cable 92 from circumferentially sliding along the aperture wall 142 during use, such as when the tower section 24 is being moved by the lifting device 30 from a horizontal orientation to a vertical orientation during a lift. Accordingly, there is no slot or other type of opening similar to the slot 68 in the bushings 62 described above. Indeed, in one embodiment, at least an outer portion of the aperture wall 142 forms a substantially closed loop about the lifting cable 92 such that the lifting cable 92 is prevented from being removed from the aperture 140 by movements of the lifting cable 92 in a generally radial direction of the bushing 118. In a preferred embodiment, however, the aperture wall 142 forms a substantially closed loop about the lifting cable 92 for substantially then entire length of the aperture wall 142. In this regard, and as explained in detail below, due to the particular design of the bushing 118 an end of the lifting cable 92 must be inserted through the aperture 140 in order to place the bushing 118 on the lifting cable 92. This is a significant departure from the design of the bushing described above.

The assembly of a sling 90 in accordance with the invention is shown in FIG. 8, which illustrates the mounting block 94 being positioned on the lifting cable 92. First, an end 150 of the lifting cable 92 is inserted into and through apertures 140 of both bushings 118 and 120 of the mounting block 94 such that the noses 132 of the bushings 118, 120 face each other and the outer faces 144 of the bushings 118, 120 face away from each other. This threading of the bushings 118, 120 is illustrated in FIG. 8. The bushings 118, 120, which may be generally slidable on the lifting cable 92 are spaced apart by an amount that permits the block main body 96 to be positioned therebetween. In this regard, the block main body 96 may be lowered such that a length of cable 92 between the two bushings 118, 120 passes through the gaps 152 in the side surfaces 102, 104 adjacent the lower surface 100 so as to be positioned within cable passage 116 of the block main body 96. With the block main body so positioned, the bushings 118, 120 may be positioned within the openings 122 in the side surfaces 102, 104 of the block main body 96. More particularly, the bushings 118, 120 may be moved in a direction generally parallel to the lifting cable 92 and toward one another so that the nose 132 of each bushing 118, 120 extends through the openings 122 and the shoulder 134 engages an abutting surface 156 to seat the bushings 118, 120 within the block main body 96.

In an exemplary embodiment, the bushings 118, 120 may be secured to the block main body 96 at least in part through an interlock, such as a ridge and groove interlock. In this regard, the block main body 96 may include ridges 158 extending radially inward and into the cable passage 116 adjacent each of the bushings 118, 120. In one embodiment, each of the ridges 158 may extend for only a portion of the circumference of the opening 122 in the block main body 96. Alternatively, there may be one continuous ridge or a plurality of ridge sections. In any event, the ridges 158 may be configured to be seated within the groove 138 in the nose 132 of the bushings 118, 120. By way of example, as the bushings 118, 120 are being brought into the openings 122 in the side surfaces 102, 104, the block main body 96 may be slightly lifted to allow the nose 132 of the bushings 118, 120 to pass by the ridges 158 and then released so that the ridges 158 drop down into the grooves 138. With the ridges 158 engaged with the grooves 138, the bushings 118, 120 are restricted from moving away from block main body 96 in a direction generally parallel to the lifting cable extending between the bushings 118,120.

To complete the securement of the bushings 118, 120 to the block main body 96, a locking plate 160 may be coupled to the main block body 96. The locking plate 160 closes off the lower surface 100 of the block main body 96 to trap the lifting cable 92 in the cable passage 116 of the mounting block 94. The locking plate 160 further secures the bushings 118, 120 with the block main body 96. In this regard, the locking plate 160 may also include a ridge 162 configured to be received in the groove 138 of the nose 132 of each bushing 118, 120. Accordingly, when the locking plate 160 is coupled to the block main body 96, the bushings 118, 120 are prevented from coming away or otherwise being separated from the block main body 96.

Figure 2:
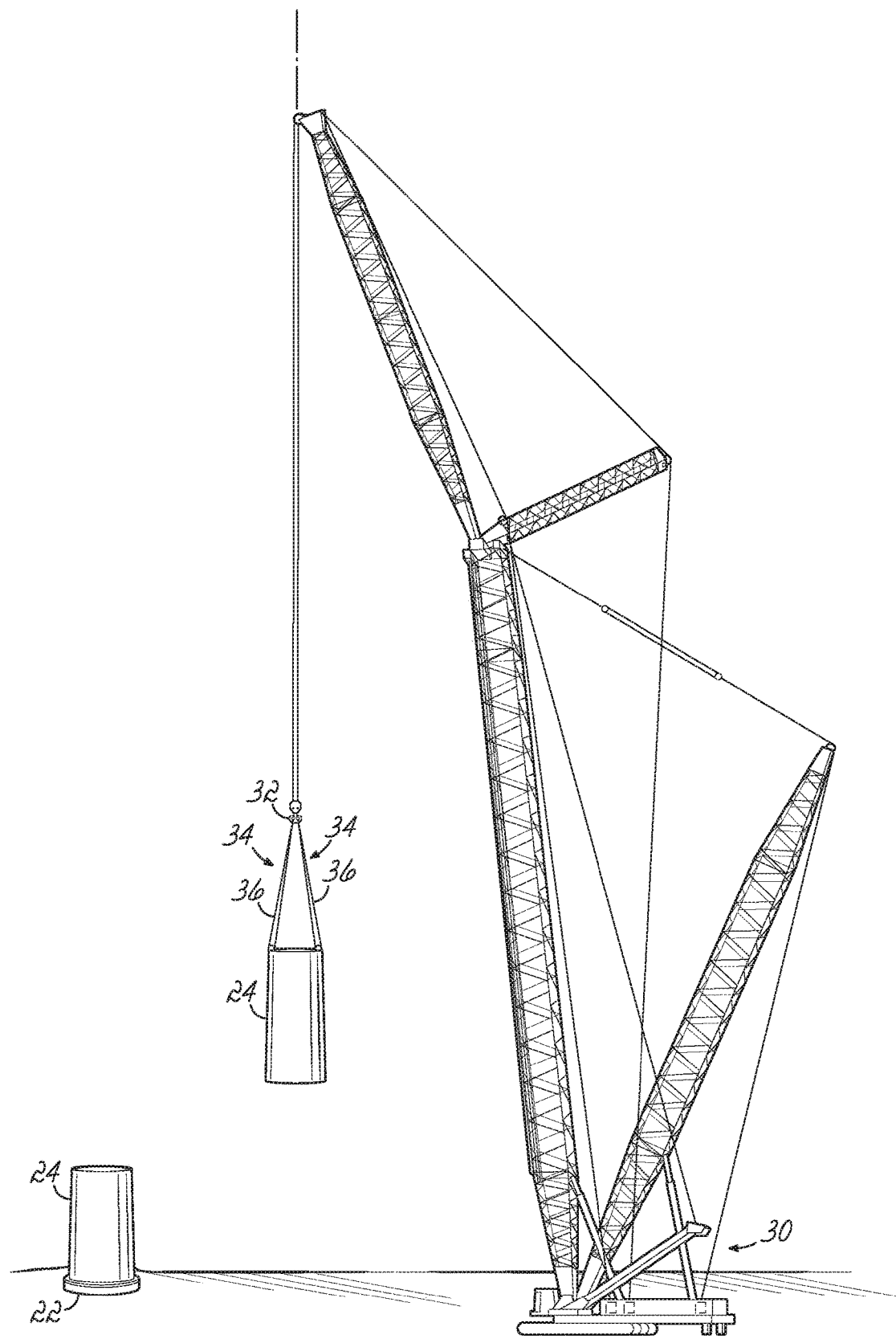
FIG. 2 is a perspective view illustrating the assembly of a wind turbine tower.
Figure 3:
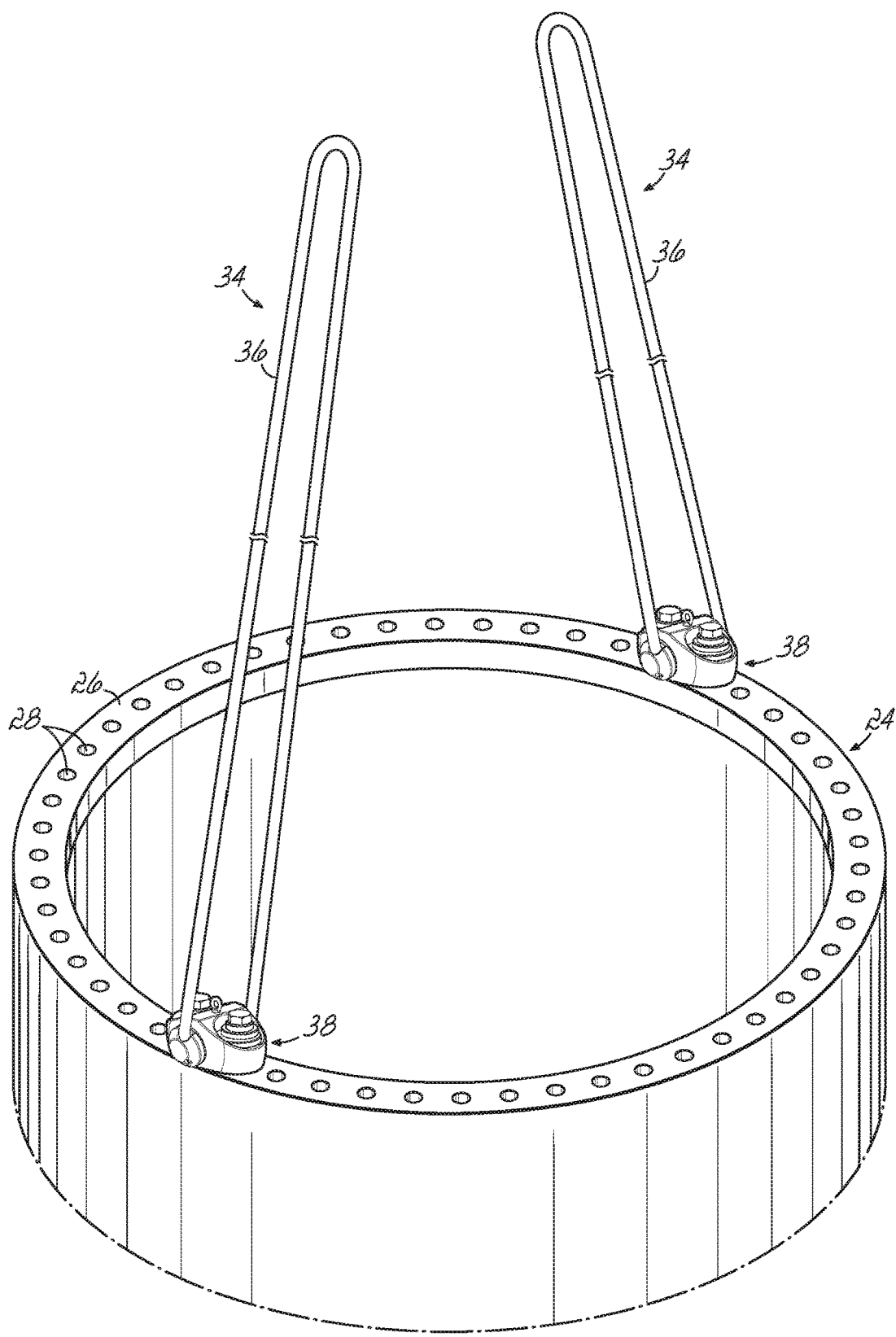
FIG. 3 is a partial perspective view of equipment for hoisting a wind turbine component, such as a wind turbine tower section, during assembly of the wind turbine.
Figure 4:
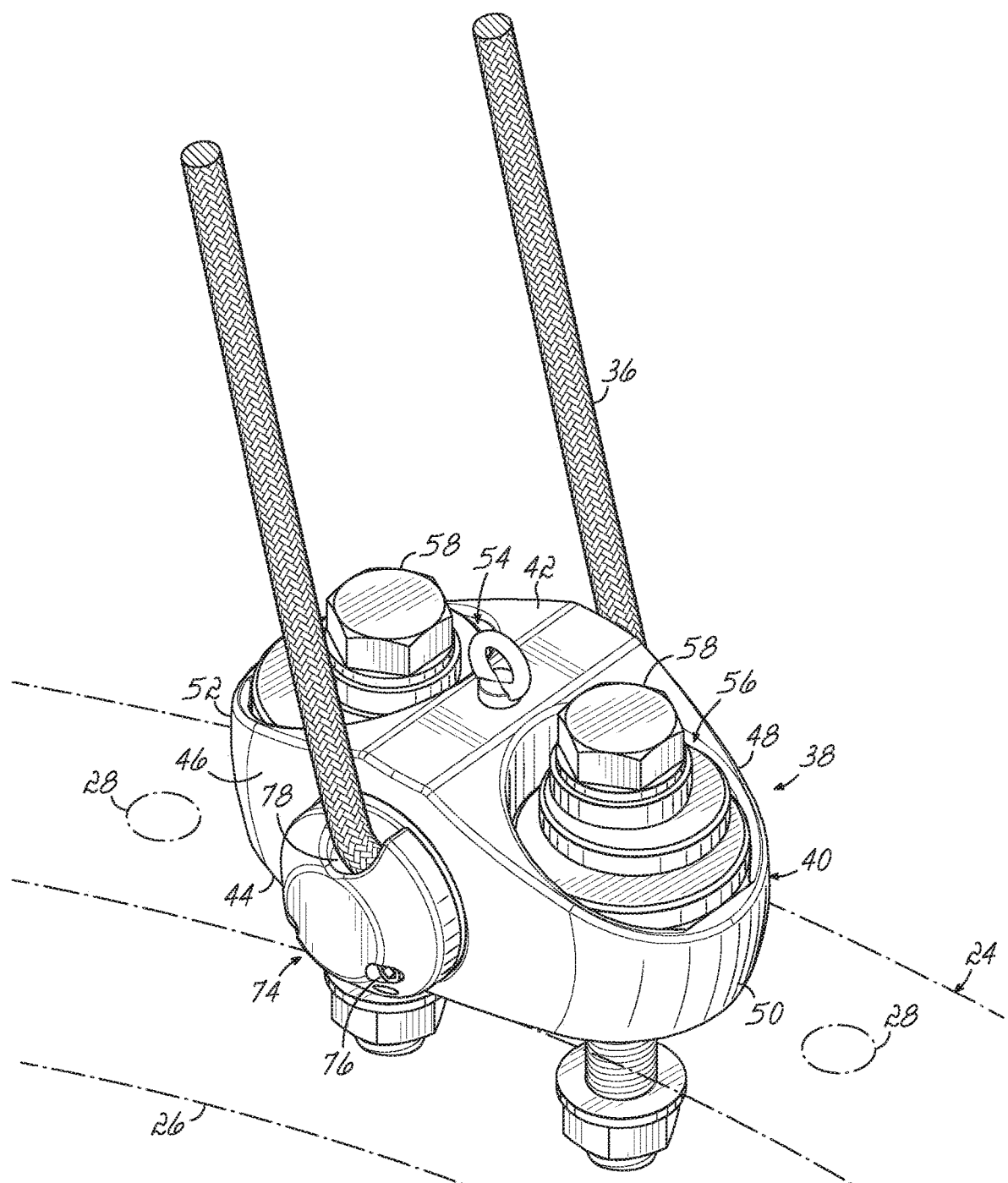
FIG. 4 is a perspective view of a mounting block for coupling a lifting cable to the wind turbine component.
Figure 5:
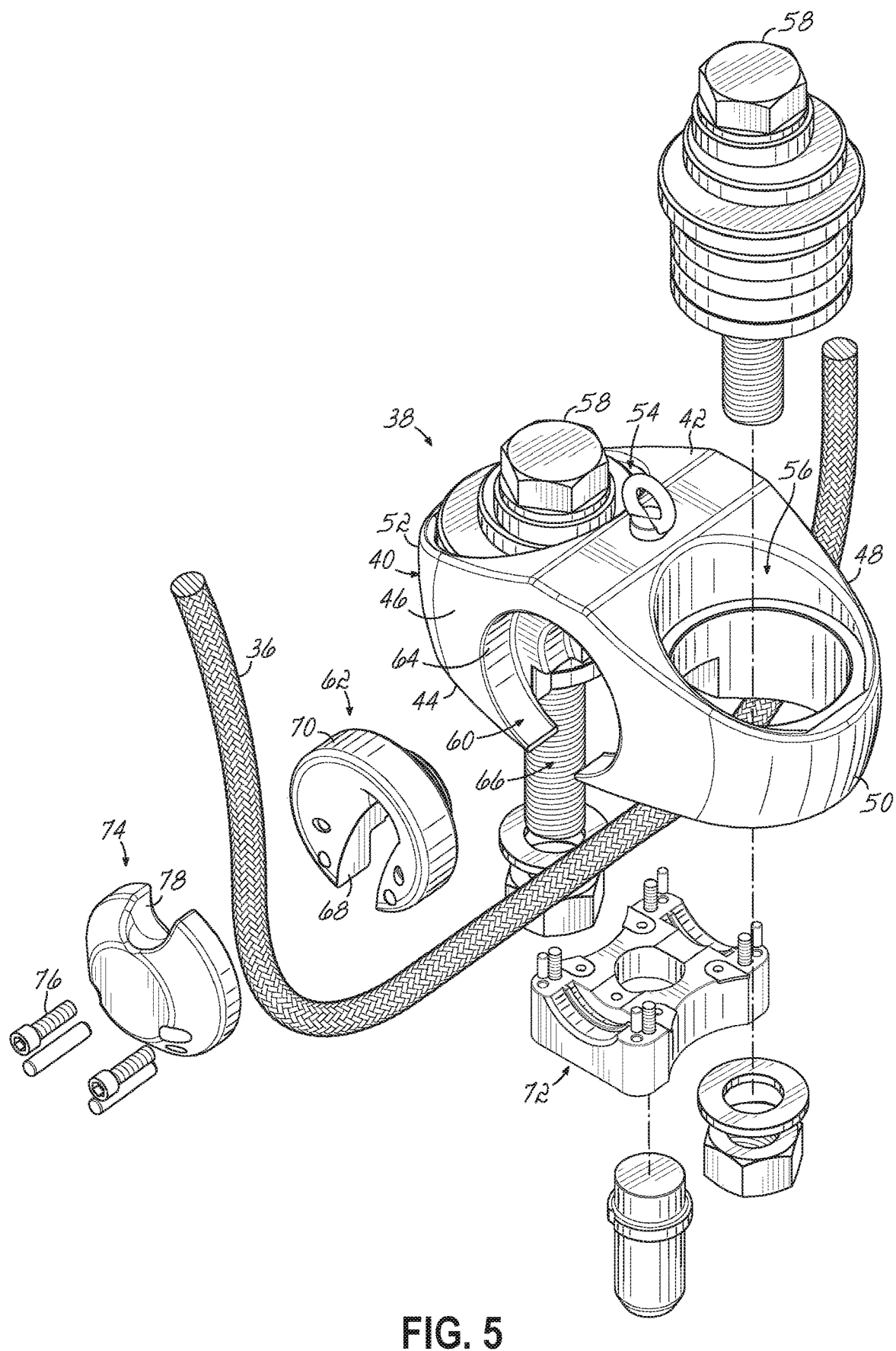
FIG. 5 is a disassembled perspective view of the mounting block shown in FIG. 4.
Figure 6:
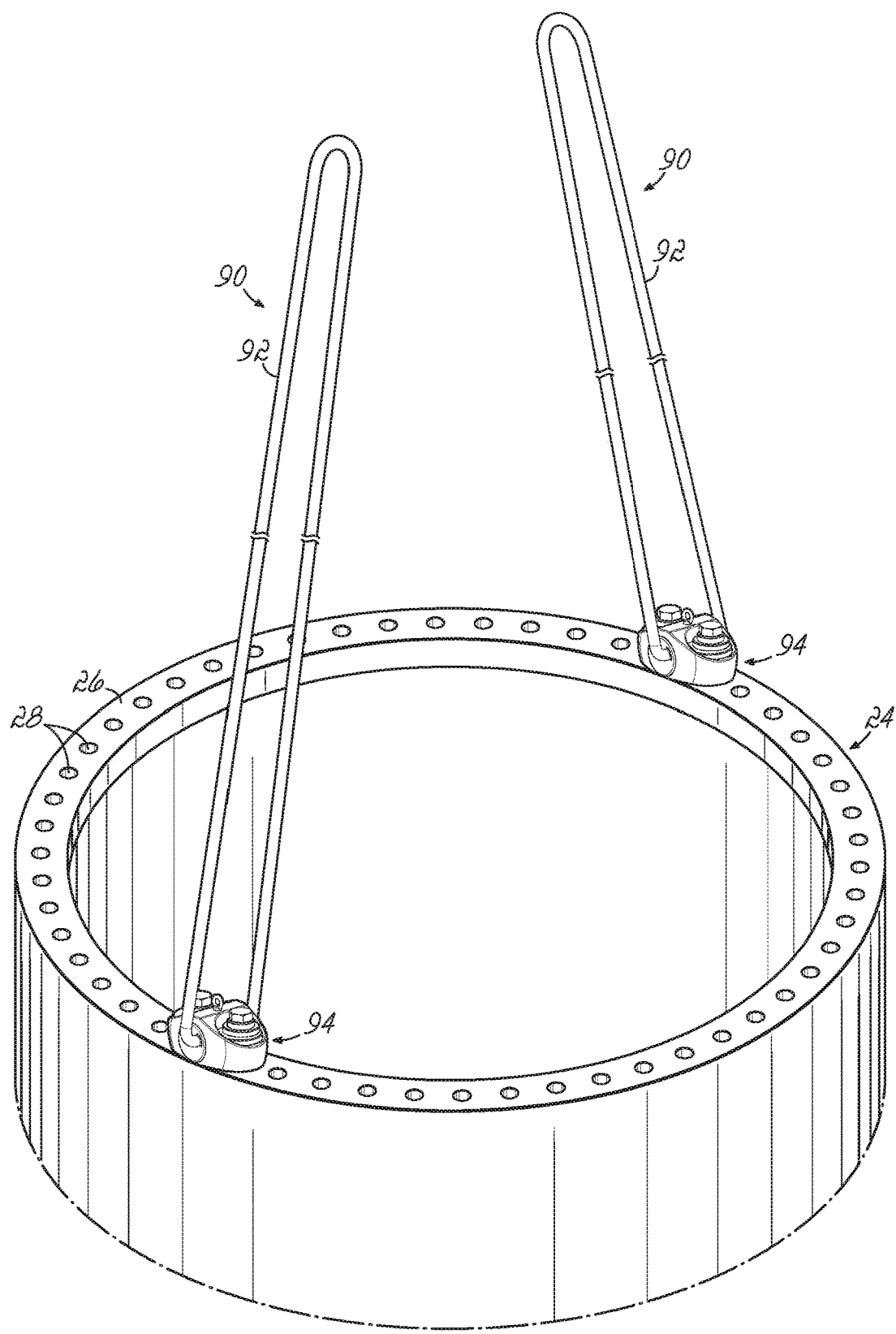
FIG. 6 is a partial perspective view of equipment for hoisting a wind turbine component in accordance with an embodiment of the present invention.

Subsequent to mounting the mounting block 94 on the lifting cable 92, the end 150 of the lifting cable 92 may be coupled to another end of the lifting cable 92 to form a closed loop configuration. In this regard, the ends of the lifting cable 92 may be coupled through any conventional method, such as via a clamp, splicing, or other equivalent binding arrangement. As illustrated in FIG. 6, a pair of slings 90 may be used to lift a wind turbine component, such as a wind turbine tower section 24. In this regard, the mounting blocks 94 may be coupled to the flange 26 of the tower section 24 via bolts 114. Similar to FIG. 2, the slings 90 may then be coupled to a lifting device 30, such as via the hook 32 of a crane.

Figure 11:
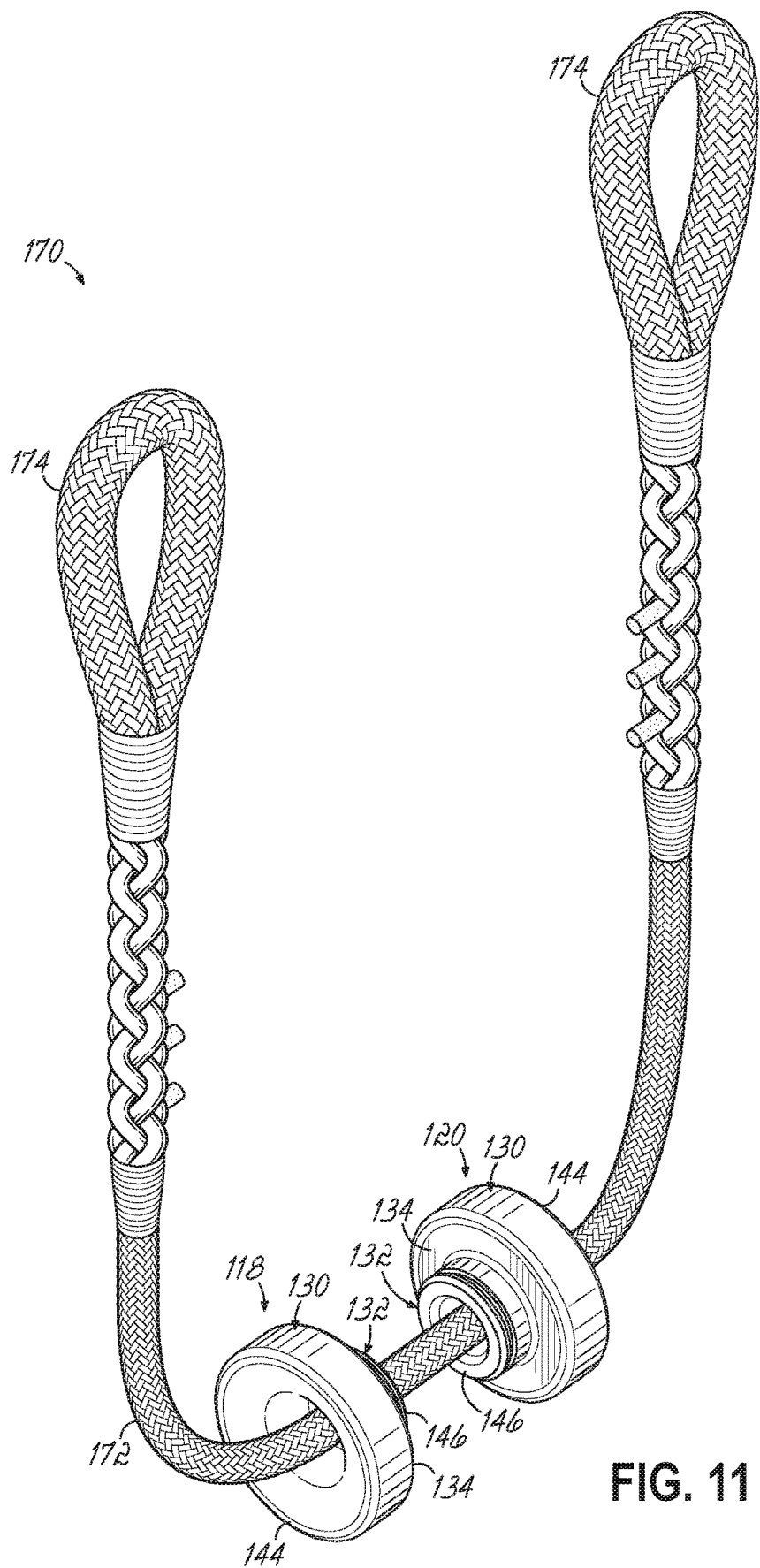
FIG. 11 is a perspective view of a sling preassembly in accordance with an embodiment of the present invention.

In another aspect, due to the different design approach taken in the present invention, there may be provided an intermediate sling assembly 170 configured to be used with the mounting block 94. In this regard, and as illustrated in FIG. 11, the intermediate sling assembly 170 includes a lifting cable 172 and a pair of bushings, such as bushings 118, 120, for the mounting block 94 preassembled or mounted on the lifting cable 172. The ends of the lifting cable 172 may be subsequently coupled together. In one embodiment, and as discussed above, the ends of the lifting cable may be clamped or spliced together so as to form a closed loop with the bushings positioned thereon. In an alternative embodiment, and as illustrated in FIG. 11, the ends of the lifting cable 172 may be turned back on an adjacent length of cable so as to form lifting loops 174 on each end of the lifting cable 172. The lifting loops 174 of the lifting cable 172 are configured to be coupled to a lifting device 30, such as on the hook 32 thereof. The bushings 118, 120 are disposed between the lifting loops 172 and may be prevented from coming off of the lifting cable 172 by the lifting loops 174. Of course, the intermediate sling assembly 170 may be coupled to a mounting block 94 generally in the manner described above.

While the lifting loops 174 may be formed by turning a length of cable back on itself, there may be other ways to form lifting loops on the ends of the lifting cable. By way of example and without limitation, an eyelet or other closed-loop member may be separately formed or fabricated and coupled to the ends of the lifting cable, such as by clamping, splicing or other equivalent arrangement. In any event, the intermediate sling assembly may generally include the bushings preassembled onto the lifting cable for use with a mounting block.

Figure 12C:
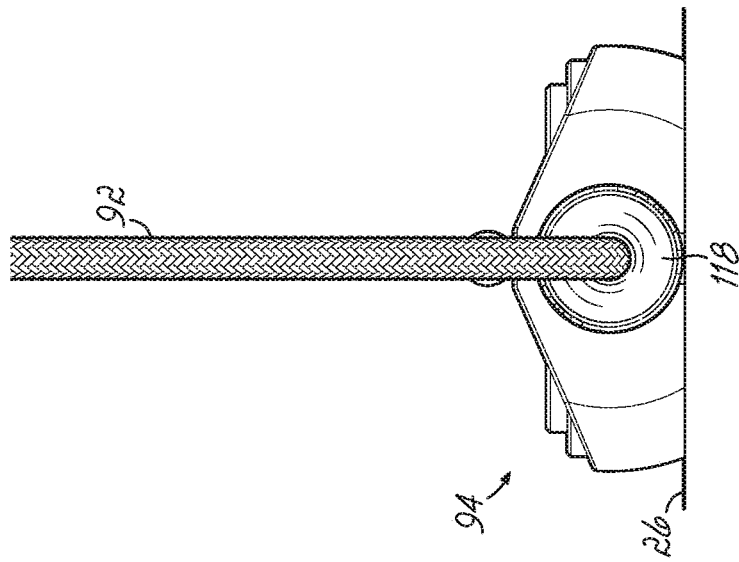
FIG. 12C is a side view illustrating the relative position of the lifting cable and mounting block when the wind turbine component is in a vertical orientation.
Figure 12B:
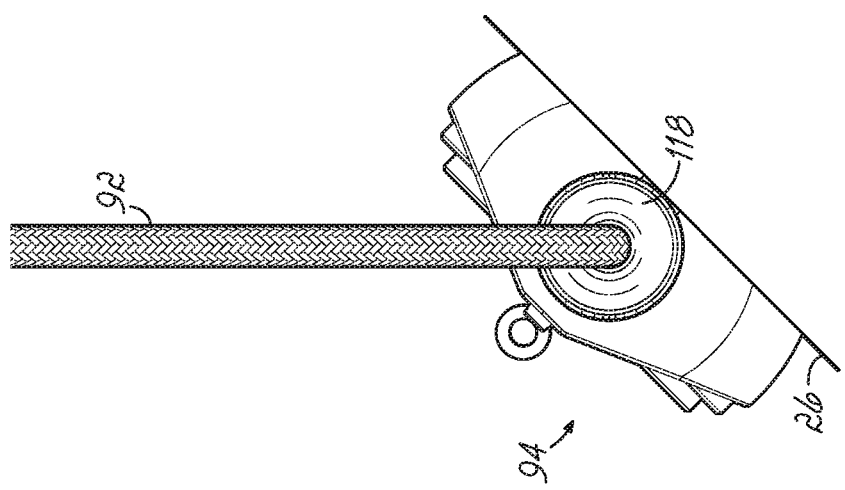
FIG. 12B is a side view illustrating the relative position of the lifting cable and mounting block when the wind turbine component is in an intermediate position between a horizontal orientation and a vertical orientation.
Figure 12A:
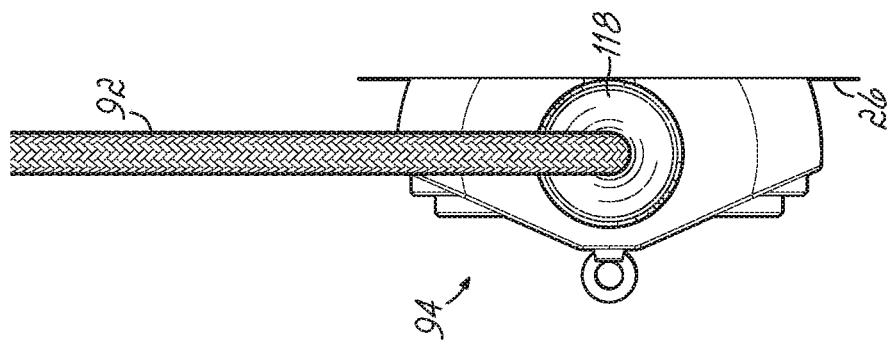
FIG. 12A is a side view illustrating the relative position of the lifting cable and mounting block when the wind turbine component is in a horizontal orientation.

As discussed above and illustrated in FIGS. 12A-12C, the relative orientation of the mounting blocks 94 and the lifting cable 92 change as the orientation of the tower section 24 changes from horizontal to vertical. It should be realized that in an exemplary embodiment, the bushings 118, 120 may be capable of rotating relative to the block main body 96. Thus, as the tower section 24 is being hoisted, the bushings 118, 120 may rotate relative to the block main body 96 to accommodate the change in orientation. In this case, there may be little to no relative movement between the lifting cable 92 and the bushings 118, 120 during a lift of the tower section 24.

An improvement in the design of the present invention is in situations where the bushings 118, 120 are not able to rotate relative to the block main body 96. The inability may be due to debris, damage, wear, etc. Additionally, the bushings 118, 120 may be specifically designed not to rotate within the block main body 96. Nevertheless, for whatever reason, the inability of the bushings 118, 120 to rotate relative to the block main body 96 does not result in the development of large stress concentrations in the lifting cable 92 due to sharp corners and other bends. Instead, as the orientation of the tower section varies from horizontal (FIG. 12A) to vertical (FIG. 12C), the lifting cable 92 is able to move or slide in a circumferential direction along the aperture wall 142 relative to the bushings 118, 120, and thereby prevent the formation of a sharp bend in the lifting cable 92 and the stress concentrations associated therewith. An embodiment in which the bushings 118, 120 do not rotate relative to the block main body 96 may be advantageous in that the mounting block 94 essentially has no relative moving parts that would be subject to potential failure. Thus, the reliability and service life of slings 90 would improve.

While the present invention has been illustrated by the description of various embodiments thereof, and while the embodiments have been described in considerable detail, it is not intended to restrict or in any way limit the scope of the appended claims to such detail. By way of example, while aspects of the present invention have been described in connection with hoisting a wind turbine tower section, aspects of the invention may prove beneficial to the handling of other wind turbine components, such as those that utilize a sling for handling such components. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. Equipment for handling a wind turbine component, comprising:
   a lifting cable; and
   a mounting block for coupling the lifting cable to the wind turbine component, the mounting block comprising:
      a block main body having a cable passage defined therethrough;
      a pair of bushings coupled to the block main body in the cable passage, each bushing having an aperture defined by an aperture wall, wherein the lifting cable extends through the aperture of each of the bushings,
   wherein at least an outer region of the aperture wall forms a closed loop about the lifting cable and is substantially circumferentially continuous, and
   wherein the aperture wall smoothly changes in cross dimension from an inner region of the aperture to the outer region.

2. The equipment according to claim 1, wherein the at least outer region of the aperture wall is circumferentially symmetric.

3. The equipment according to claim 1, wherein substantially the entire length of the aperture wall forms a closed loop about the lifting cable.

4. The equipment according to claim 1, wherein substantially the entire length of the aperture wall is circumferentially continuous.

5. The equipment according to claim 1, wherein substantially the entire length of the aperture wall is circumferentially symmetric.

6. The equipment according to claim 1, wherein a cross dimension of an inner region of the aperture wall is relatively constant.

7. The equipment according to claim 1, wherein the aperture wall is trumpet-shaped.

8. The equipment according to claim 1, wherein the lifting cable extending through each of the bushings is permitted to move in a circumferential direction along the aperture wall relative to the bushings.

9. Equipment for handling a wind turbine component, comprising:
   a lifting cable; and a mounting block for coupling the lifting cable to the wind turbine component, the mounting block comprising:
  a block main body having a cable passage defined therethrough;
  a pair of bushings coupled to the block main body in the cable passage, each bushing having an aperture defined by an aperture wall, wherein the lifting cable extends through the aperture of each of the bushings,
wherein at least an outer region of the aperture wall forms a closed loop about the lifting cable and is substantially circumferentially continuous, and
wherein the aperture wall smoothly and continuously increases in cross dimension along the outer region of the aperture wall.

10. The equipment according to claim 9, wherein substantially the entire length of the aperture wall is smooth.

11. Equipment for handling a wind turbine component, comprising:
a lifting cable; and
a mounting block for coupling the lifting cable to the wind turbine component, the mounting block comprising:
  a block main body having a cable passage defined therethrough;
  a pair of bushings coupled to the block main body in the cable passage, each bushing having an aperture defined by an aperture wall, wherein the lifting cable extends through the aperture of each of the bushings,
wherein at least an outer region of the aperture wall forms a closed loop about the lifting cable and is substantially circumferentially continuous, and
wherein the bushings are permitted to rotate relative to the block main body.

12. The equipment according to claim 1, wherein the mounting block has no relative moving parts during use of the equipment.

13. The equipment according to claim 1, wherein the lifting cable includes a first and second end, and wherein the first and second ends are coupled together to form a closed loop, or each of the first and second ends includes a lifting loop.

14. A method of assembling equipment for handling a wind turbine component, comprising:
providing a lifting cable having a first end and a second end;
providing a mounting block for coupling the lifting cable to the wind turbine component, the mounting block comprising a block main body and a pair of bushings configured to be coupled to the block main body, each bushing having an aperture defined by an aperture wall for receiving at least a portion of the lifting cable, wherein at least an outer region of the aperture wall forms a closed loop and is substantially circumferentially continuous, and wherein the aperture wall smoothly changes in cross dimension from an inner region of the aperture to the outer region;
inserting at least one of the first and second ends of the lifting cable through the aperture in each of the bushings such that the bushings are threaded onto the lifting cable;
inserting an intermediate portion of the lifting cable into a passage of the block main body; and
coupling the bushings to the block main body to capture the lifting cable within the mounting block,
wherein the lifting cable extending through each of the bushings is permitted to move in a circumferential direction along the aperture wall relative to the bushings.

15. The method according to claim 14, further comprising subsequent to positioning the bushings onto the lifting cable, coupling together the first and second ends of the lifting cable to form a closed loop, or providing lifting loops at each of the first and second ends of the lifting cable.

16. A method of handling a wind turbine component using equipment assembled according to claim 14, comprising:
  coupling the mounting block to a wind turbine component;
  coupling the lifting cable to a lifting device; and
  lifting the wind turbine component using the lifting device,
  wherein during the lifting step, the lifting cable extending through each of the bushings moves in a circumferential direction along the aperture wall relative to each of the bushings.

* * * * *